United States Patent [19]

Burke

[11] Patent Number: 5,036,266

[45] Date of Patent: Jul. 30, 1991

[54] MASS VELOCITY CONTROLLER

[75] Inventor: Edward F. Burke, Lake Oswego, Oreg.

[73] Assignee: Tektronix, Inc., Beaverton, Oreg.

[21] Appl. No.: 502,379

[22] Filed: Mar. 30, 1990

Related U.S. Application Data

[63] Continuation-in-part of Ser. No. 297,202, Jan. 17, 1989.

[51] Int. Cl.[5] .............................................. G05B 15/00
[52] U.S. Cl. .................................... 318/646; 318/615;
318/561; 318/618; 310/15; 400/322; 73/519;
73/651; 73/862.41; 73/862.42
[58] Field of Search ................. 318/646, 615, 561, 618;
310/15; 400/322; 73/519, 651, 862.41, 862.42

[56] References Cited

U.S. PATENT DOCUMENTS

| | | | |
|---|---|---|---|
| 4,213,714 | 7/1980 | Jones et al. | 400/322 X |
| 4,260,914 | 4/1981 | Hertrich | 310/15 X |
| 4,301,887 | 11/1981 | Fiske, Jr. | 310/15 X |
| 4,331,910 | 5/1982 | Kohzai et al. | 318/618 |
| 4,459,050 | 7/1984 | Goldberg et al. | 400/322 |
| 4,465,047 | 8/1984 | Yamaguchi et al. | 73/651 |
| 4,481,453 | 11/1984 | Welburn | 318/696 |
| 4,535,277 | 8/1985 | Kurakake | 318/561 |
| 4,636,700 | 1/1987 | Moore et al. | 318/611 |
| 4,816,734 | 3/1989 | Kurakake et al. | 318/615 |
| 4,928,538 | 5/1990 | Burdess et al. | 73/862.41 |

Primary Examiner—William M. Shoop, Jr.
Assistant Examiner—Saul M. Bergmann
Attorney, Agent, or Firm—John D. Winkelman; Ann W. Speckman

[57] ABSTRACT

A system (11) for monitoring and controlling the movement of a mass (12) along a predetermined path (14) by a motor-driven flexible member (20) is provided to modulate the motor drive output so that the actual velocity of the mass corresponds more closely to the desired target velocity profile. The system preferably employs a dual loop servo system wherein an outer servo loop uses conventional linear encoding techniques and is supplemented by an inner servo loop utilizing a sensor (27) that detects a physical characteristic of the flexible member representative of the relative velocity of the mass. Relative velocity transducers utilizing magnetic circuits and operating according to variable reluctance principles for generating relative mass velocity signals directly are disclosed.

20 Claims, 10 Drawing Sheets

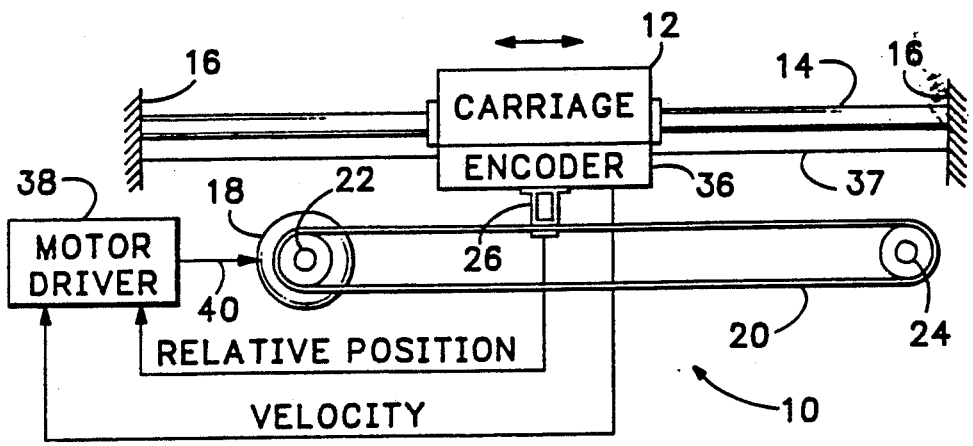
FIG.1
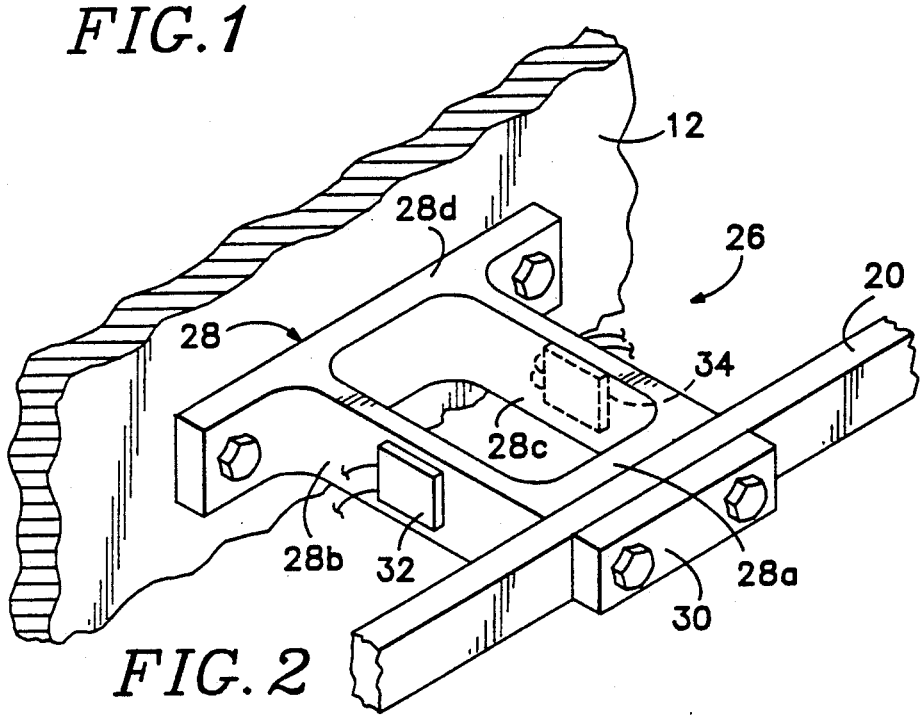
FIG.2
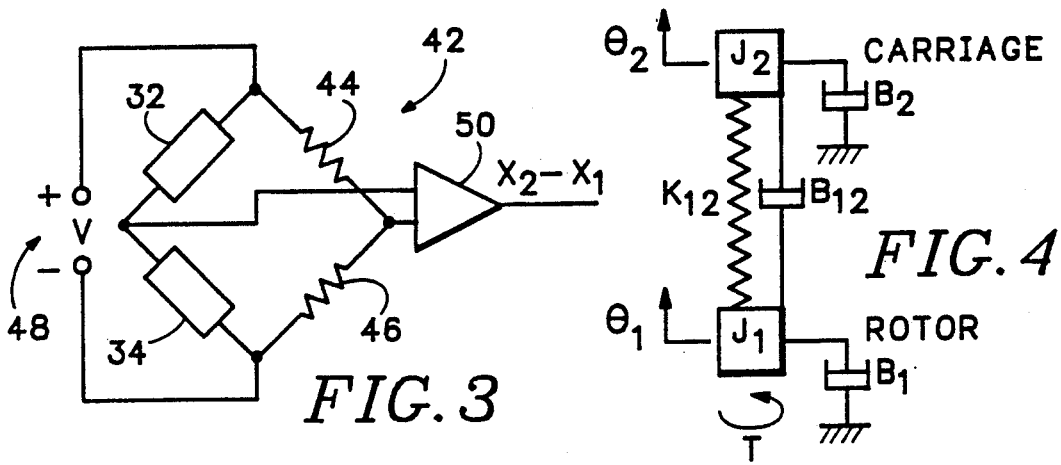
FIG.3
FIG.4

MASS VELOCITY CONTROLLER

This application is a continuation-in-part of U.S. patent application Ser. No. 07/297,202, filed Jan. 17, 1989.

FIELD OF THE INVENTION

This invention relates to methods and apparatus for monitoring and controlling the motion of a mass, and relates more particularly to improved feedback systems for providing that the actual position or velocity of a mass corresponds more closely to its desired position or velocity profile.

BACKGROUND OF THE INVENTION

The methods and apparatus of the present invention are especially suitable for monitoring and controlling the position, movement or velocity of an object driven by a non-rigid means, such as a belt, cable, or the like. An exemplary system that will be used for illustrative purposes throughout this disclosure is a shuttle carriage of an ink jet printer driven by a flexible cable, which is in turn moved by rotational motor drive output. Precise control is especially challenging where the mass is relatively large and the cable is, of necessity, flexible and somewhat elastic.

In printer applications, the desired shuttle carriage velocity profile is conveyed directly to a motor, and the motor generates rotational output corresponding to the desired velocity profile. A printer carriage is typically driven by a cable and pulley system or a cogged timing belt which translates the rotational motor drive output to printer carriage movement along a linear path. The timing belt or cable is flexible to accommodate the rotational motor drive output, and it is therefore subject to forces that cause the actual carriage velocity to deviate from the desired velocity profile. The flexible nature of the cable generates undesirable velocity ripples which cause print defects as a result of variations in ink drop exit velocity from the printer carriage. This problem is generally aggravated as the mass or object increases in weight and/or the cable increases in flexibility. In order to generate high fidelity images, such as during printing operations, the actual carriage velocity must be closely monitored and controlled to ensure that it corresponds as closely as possible to the desired velocity profile.

The cable or belt in the printer carriage system is equivalent to a linear spring that obeys Hooke's law, and deflection can therefore be determined as a function of the cable force. The cable or belt driven system is analogous to a mass/spring model system in which the internal damping in the cable is represented by a dashpot in parallel with the spring. In contrast to the more common case where one end of the spring is fixed, however, in the printer carriage mass/spring model system, the other end of the spring is not connected to mechanical ground. Instead, it is attached to the motor rotor, and the rotor is related to mechanical ground through an electromagnetic connection. Substantial deviation of the actual carriage motion from the desired velocity profile is due to extension or compression of the spring (belt or cable), and the remainder is due to errors in the position of the motor rotor.

In printer applications, at least two different control architectures have been implemented. According to one approach, an encoder or tachometer is mounted on the motor shaft to provide a motor shaft velocity signal. This system does not provide direct information concerning the position or velocity of the printer carriage, however, and it cannot correct for substantial deviation of carriage motion from the desired velocity profile due to forces exerted on the belt or cable. This approach therefore does not address a primary source of inaccuracy, since the printer carriage and the cable or belt are outside the servo loop.

A second control architecture employs a clock track encoder mounted on the carriage itself that reads a linear encoding strip mounted in fixed relationship to the carriage. According to this approach, the actual velocity of the printer carriage is monitored, but the responsiveness of the system can be unsatisfactory. In other words, the system is not effective in correcting deviations in the actual carriage position until the deviations have already occurred and printing errors have been introduced. This type of control system may thus be suitable for providing gross control functions, but it is limited in the fine control it can provide. Additionally, this control architecture presents a difficult servo system to implement because the resonant mass/spring system is in the loop.

One important principle of feedback systems design is that the servo system must not have a phase shift ("around" the loop) of 180° or more for any frequency for which the system gain is unity or greater. If a higher phase shift is introduced, the servo system will oscillate rather than functioning as a linear feedback control system. In systems that incorporate a mass/spring system, it is easy to consume most of the 180° allowable phase shift on the mass/spring portion of the system, leaving very little for the rest of the servo system. For this reason, it is difficult to incorporate mass/spring systems in servo loops.

To provide a stable servo loop in a single loop system incorporating a mass/spring component, it is generally necessary to reduce the system bandwidth and loop gain. In a velocity servo loop, loop gain is a good predictor of the velocity error which will result from a sudden increase or decrease of drag on the carriage. Similarly, the system bandwidth is indicative of the speed with which the servo can react to and recover from an adverse disturbance. Loop gain and bandwidth are therefore critical characteristics of the servo system, and high performance servo systems require elevated loop gain and bandwidth characteristics.

SUMMARY OF THE INVENTION

The present invention provides a stable, high performance system for monitoring and controlling carriage (mass) position or velocity directly. More particularly, one aspect of the present invention provides a system for controlling the movement of a mass reciprocated along a linear path by a motor-driven flexible member using a dual loop servo system. An "outer" servo loop using conventional linear encoder techniques operates normally, and is supplemented by an "inner" servo loop which utilizes a sensor that detects a physical characteristic of the flexible member linking the motor and the mass representative of the position or velocity of the mass relative to the position or velocity of the motor. A feedback circuit is responsive to the sensed physical characteristic for adjusting the target velocity signal to reduce the variation between the target and actual velocities of the mass.

In a preferred embodiment, a load cell comprising a strain gauge sensor for sensing flexure forms part of a coupling member linking the printer carriage and the cable. Flexure of the coupling member is related to the load or force on the belt and the distortion of the belt, such as extension or compression, is proportional to its load. The mechanical stiffness of the sensor (the ratio of deflection to applied force) is designed to be much higher than that of the cable or belt.

The flexure sensed by the load cell thus provides a feedback signal representative of the distortion of the connecting cable or belt. The load cell distortion is negligible. The feedback signal provides a direct indication of the carriage position relative to the motor position, which can be differentiated to produce a signal that is representative of the carriage velocity relative to the motor velocity. This inner servo loop signal, referred to herein as a relative carriage velocity signal, is combined with the outer servo loop carriage velocity signal derived from the linear encoder to reduce disparities between the actual and target carriage velocities.

Alternatively, the inner loop may employ a relative velocity transducer to measure the relative printer carriage velocity directly. One preferred relative velocity transducer utilizes a magnetic circuit operating according to variable reluctance principles to generate a relative carriage velocity signal directly without requiring differentiation of a relative position signal. The relative carriage velocity signal is used to generate a velocity error signal that adjusts the target velocity signal to compensate for distribution of the flexible cable.

A control system having inner and outer servo loops is thus provided according to the present invention that effectively modulates the motor drive output so that the actual carriage velocity corresponds more closely to the desired target velocity profile. These and other features and advantages of the present invention will become apparent from a reading of the detailed description with reference t the accompanying drawings.

BRIEF DESCRIPTION OF THE DRAWINGS

FIG. 1 shows a block diagram schematically illustrating one embodiment of a control system according to the present invention.

FIG. 2 is a fragmentary diagram illustrating a coupling member for joining the belt to the carriage that incorporates a strain gauge sensor.

FIG. 3 is a simplified diagram illustrating a suitable bridge circuit for the strain gauge sensor of FIG. 2.

FIG. 4 is a diagram illustrating the spring/mass model of the printer system shown in FIG. 1.

FIG. 7 shows the Bode plot for the control system with the outer loop disabled; FIG. 8 shows the control system with the inner loop disabled; and FIG. 9 illustrates total control system operation.

DETAILED DESCRIPTION OF PREFERRED EMBODIMENTS

Figure 5:
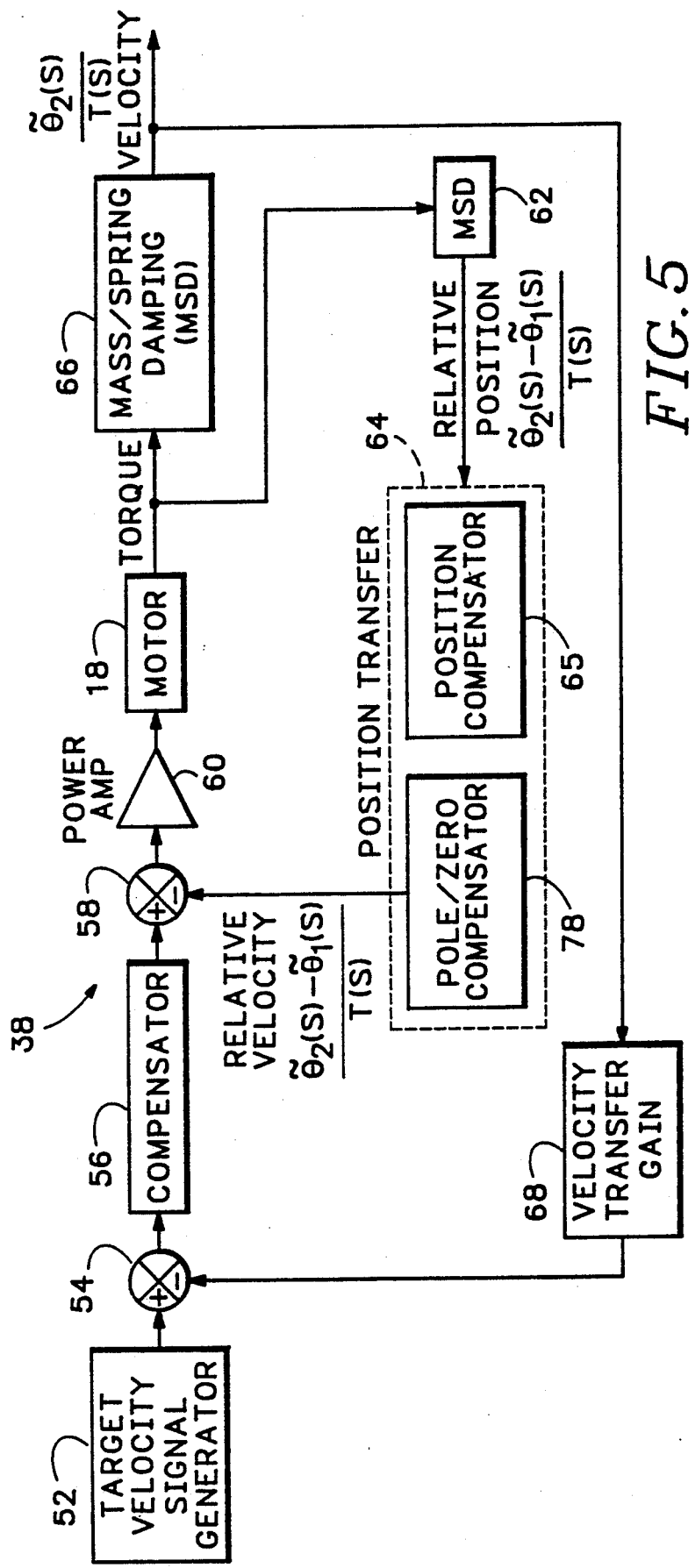
FIG. 5 is a block diagram schematically illustrating the loop topology for the system of FIG. 1 using a strain gauge sensor of the type shown in FIG. 2.

FIG. 1 illustrates schematically a control system 10 of the present invention for monitoring and controlling the movement of a carriage 12 mounted on a bar 14. Bar 14 is rigidly mounted to a framework at mountings 16, and carriage 12 is reciprocated on a linear path defined by bar 14. A target velocity signal is output by a motor driver 38 and conveyed by a conductor 40 as input to a motor 18 for controlling the velocity of carriage 12 as it reciprocates on bar 14. Rotational output from motor 18 drives a continuous timing belt 20 mounted on a motor pulley 22 and an idler pulley 24. A coupling member 26 is mounted on carriage 12 and belt 20 to convey the movement of belt 20 to carriage 12.

Referring again to FIG. 1, carriage 12 also has an optical encoder 36 mounted on it which reads a linear encoding strip 37 mounted fixedly relative to bar 14 as carriage 12 reciprocates along bar 14. The optical encoder provides information for the outer servo loop of the control system. The frequency of the pulse train generated by the encoder is indicative of the velocity of the carriage. The pulse train is converted to an analog signal in a frequency-to-voltage converter. This signal is fed through a loop filter, as will be described, to produce an analog velocity signal which is processed in motor driver 38. Motor driver 38 compares the actual carriage velocity to the target velocity and modulates the input to motor 18, thereby modulating the linear velocity of carriage 12. As described earlier, this type of servo loop provides only relatively coarse control and is difficult to incorporate in a control system as a result of the mass/spring characteristics of the system.

Carriage velocity fine control must be provided by detecting changes in carriage velocity as they occur or, if possible, anticipating changes in the carriage velocity before they actually occur and correcting for them. Disparities in the actual carriage velocity from the desired velocity profile are largely attributable to the flexible character of the belt or cable drive system, and the applicant's efforts have been directed to sensing distortion of the flexible belt or cable drive system in an effort to anticipate changes in the carriage velocity.

The control system of the present invention employs an inner servo loop in combination with the outer servo loop described above. According to one embodiment, coupling member 26 serves as a carriage position sensor by sensing forces exerted on the coupling member by the belt. Coupling member 26, shown in FIG. 2, comprises a mounting bracket 28 having an internal opening. A clamp end 28a is fixedly mounted on belt 20 by a clamping plate 30 and appropriate mounting means for rigidly mounting the clamping plate on end 28a. Extending from opposite ends of clamp end 28a are elongate flexible arms 28b and 28c. These arms extend to a carriage mounting end 28d having flared flanges which are fixedly attached to carriage 12, as shown. Strain gauges 32 and 34 are mounted to the flexible arms 28b and 28c. Suitable strain gauges are well known in the art and include those sold under the proprietary name of Transducer-Class strain gauges, model number EA-13-T043P-10C sold by Measurements Group, Inc. of Raleigh, N.C..

Mounting bracket 28 is preferably made of 7075 T6 extruded aluminum, with a width across end 28a of approximately 0.7 inches. The flexible arms have a length of about ⅛ inch in the uniform thickness region. It will be understood by those skilled in the art that other strain gauges and alternative designs and dimensions for coupling member 26 are suitable for use in accordance with the present invention. For instance, four strain gauges could be employed, with the additional two being mounted on the inside surfaces of arms 28b and 28c.

A representative strain gauge bridge circuit 42 is illustrated in FIG. 3. The two strain gauges 32 and 34 are connected in a bridge formation with resistors 44 and 46, and are driven by a reference voltage source 48. The strain gauges are connected as shown so that upon flexing of arms 28b and 28c during movement of carriage 12, one gauge senses a force due to compression, and the other senses a force due to tension. In the reverse direction, each strain gauge senses the opposite form of force. The two strain gauges thus, when strained, produce a differential voltage which is fed into a differential amplifier 50. The amplifier produces an output signal representative of the load on the strain gauge sensor. This load is also directly proportional to the elongation of belt 20 between pulley 22 and carriage 12. The strain gauge sensor thus detects the shift in position of the carriage relative to the rotor due to belt distortion.

FIG. 4 illustrates the spring/mass model of the system of FIG. 1. The motor rotor is represented by the variables having a subscript 1, and the carriage is represented by the variables having a subscript 2. Rotary units have been used throughout this analysis. The rotor has a torque T and mass moment of inertia $J_1$, and the rotary position of the in the Laplace domain. The carriage has a calculated mass moment of inertia $J_2$ and has a rotary position represented by $\theta_2$ in the time domain and $\Theta_2$ in the Laplace domain. Theoretical dashpots $B_1$ and $B_2$ have effective positions between the frame and the rotor and carriage, respectively, and represent damping forces. The belt is represented by a spring having a coefficient $K_{12}$ and a dashpot having a coefficient $B_{12}$, representing internal damping in the belt.

Prior to making a physical prototype of the control system illustrated in FIGS. 1-3, the mass/spring dynamics and compensation of the proposed system were modeled as shown in FIG. 4, and simulated on a computer system having the proprietary name LSAP available from California Scientific Software. The mass/spring model was based upon the following physical parameters. Drive pulley 22 has 32 teeth at 0.08 pitch; the timing belt has 535 teeth; and the axes of the idler and motor pulleys are 20.12 inches apart. The stiffness of the belt, experimentally measured as the AE constant, was determined to be $1.069 \times 10^4$ LB. The effective translational stiffness deployed on the pulleys is $K_{TOT} = 1.332 \times 10^3$ LB/IN. In rotary coordinates, the stiffness coefficient $K_\Theta = K_{TOT} \times R^2 = 221.1$ LB-IN/RADIAN. This results in a fundamental frequency for the belt/pulley/carriage combination of $f_N = 80$ Hz.

A damping coefficient was calculated on the basis that force is proportional to velocity and inversely proportional to the length of the belt, or $F = c'x/L$. Solving this equation for $c'$, $c' = 2.9948$ LB-SEC/IN. A total damping coefficient is calculated as $c_{TOT} = 3.732 \times 10^{-1}$ LB-SEC/IN. In rotary coordinate units, $c_{74} = 6.19 \times 10^{-2}$ LB-IN-SEC/RAD = $B_{12}$.

The equations for rotary motion of the motor rotor and the carriage are:

$$J_1\ddot{\theta}_1 = -K_{12}(\theta_1-\theta_2)-B_{12}(\dot{\theta}_1-\dot{\theta}_2)-B_1(\dot{\theta}_1)+T$$

$$J_2\ddot{\theta}_2 = K_{12}(\theta_1-\theta_2)+B_{12}(\dot{\theta}_1-\dot{\theta}_2)-B_2(\dot{\theta}_2)$$

Where $\theta$ represents position, $\dot{\theta}$ represents velocity, and $\ddot{\theta}$ represents acceleration, all in the time domain.

Assuming steady state conditions, these equations, after grouping terms and converting to the Laplace domain, are as follows:

$$[J_1s^2+(B_{12}+B_1)s+K_{12}]\Theta_1(s)-(B_{12}s+K_{12})\Theta_2(s) = T$$

$$-(B_{12}s+K_{12})\Theta_1(s)+[J_2s^2+(b_{12}+B_2)s+K_{12}]\Theta_2(s) = 0$$

where $\Theta$ represents position and s represents the independent variable in the Laplace domain.

Solving for the position variable transforms of the motor and carriage as well as the velocity of the carriage results, after considerable manipulation, in the following equations for the position of the first and second masses, the relative position of the masses, and the velocity of the second mass, respectively, where the notation $\tilde{\Theta}_2(s)/T(s)$ indicates the velocity of the second mass, e.g., the carriage, expressed as the Laplace domain transfer function:

$$\frac{\theta_1(s)}{T(s)} = \frac{N_{12}s^2 + N_{11}s + N_{10}}{s^4 + D_3s^3 + D_2s^2 + D_1s}$$

$$\frac{\theta_2(s)}{T(s)} + \frac{N_{21}s + N_{20}}{s^4 + D_3s^3 + D_2s^2 + D_1s}$$

$$\frac{\theta_2(s) - \theta_1(s)}{T(s)} = \frac{-N_{12}s + (N_{21} - N_{11})}{s^3 + D_3s^2 + D_2s + D_1}$$

$$\frac{\tilde{\theta}_2(s)}{T(s)} = \frac{N_{21}s + N_{20}}{s^3 + D_3s^2 + D_2s + D_1}$$

Where:

$$N_{12} = \frac{1}{J_1} \quad N_{20} = \frac{K_{12}}{J_1J_2}$$

$$N_{11} = \frac{B_{12} + B_2}{J_1J_2} \quad N_{10} = \frac{K_{12}}{J_1J_2}$$

$$D_3 = \frac{B_1}{J_1} + \frac{B_{12} + B_2 + B_{12}}{J_2}$$

$$D_2 = \frac{K_{12}(J_1 + J_2) + B_{12}B_2 + B_{12}B_1 + B_1B_2}{J_1J_2}$$

$$N_{21} = \frac{B_{12}}{J_1J_2} \quad D_1 = \frac{K_{12}(B_1 + B_2)}{J_1J_2}$$

The values for these variables, based upon the physical parameters set forth above are as follows:

$$B_1 = 1.97 \times 10^{-4} \frac{\text{LB-IN-SEC}}{\text{RAD}}$$

$$B_{12} = 6.19 \times 10^{-2} \frac{\text{LB-IN-SEC}}{\text{RAD}}$$

$$B_2 = 5.029 \times 10^{-4} \frac{\text{LB-IN-SEC}}{\text{RAD}} \text{ (.1 LB @ 33 IPS)}$$

-continued $$J_1 = 1.459 \times 10^{-4} \text{ LB-IN-SEC}^2$$

$$J_2 = 8.60 \times 10^{-4} \text{ LB-IN-SEC}^2$$

$$K_{12} = 221.1 \frac{\text{LB-IN}}{\text{RAD}}$$

FIG. 5 shows a block diagram of a control system 10 as shown in FIG. 1 employing a strain gauge or the like in an inner servo loop, based on the transfer function concept just presented. The transfer functions for relative position, i.e. $(\Theta_2(s) - \Theta_1(s))/T(s)$ and velocity of the carriage, i.e. $\dot{\Theta}_2(s)/T(s)$, provide a model of the inner servo loop mass/spring damping of the physical operating system. Target velocity signal generator 52 feeds a target velocity signal through a signal combiner 54, a compensator 56, and another signal combiner 58. The signal from combiner 58 passes through a power amplifier 60 which processes the signal for driving motor 18. The output of motor 18 is the torque applied to belt 20. This torque acts through the mass spring damping effects of the motor and belt as represented by inner servo and outer servo blocks 62 and 66, respectively.

Based upon the position and velocity variable transforms set forth above and utilizing a control system as shown schematically in FIG. 1, the inner servo loop detects a physical characteristic of the flexible member linking the motor and the carriage to provide a signal indicative of the carriage position relative to the motor position at block 62. The relative position signal is fed through a position transfer block 64 comprising a position compensator 65 and a pole/zero compensator 78 which converts the relative position signal represented by $(\Theta_2(s) - \Theta_1(s))$ to a relative velocity signal $(\dot{\Theta}_2(s) - \dot{\Theta}_1(s))$. The pole zero compensator acts like a differentiator at low frequencies. The relative velocity signal is then used to generate an inner loop velocity error signal at combiner 58.

The outer servo loop employs a linear encoder to produce a signal indicative of carriage velocity The carriage velocity signal is input through a velocity transfer gain circuit 68. An outer loop velocity signal is thereby generated and fed into signal combiner 54, where an outer loop velocity error signal is derived for reducing the variation of the actual velocity from the target velocity. The target velocity signal generated by target velocity signal generator 52, the outer loop velocity error signal derived at signal combiner 54, and the inner loop velocity error signal derived at signal combiner 58 are all combined to modify input to motor 18. In this fashion, the actual carriage velocity, and hence the actual carriage position at any time point, corresponds more closely to the desired carriage velocity, and hence the desired carriage position at the corresponding time point.

Figure 6:
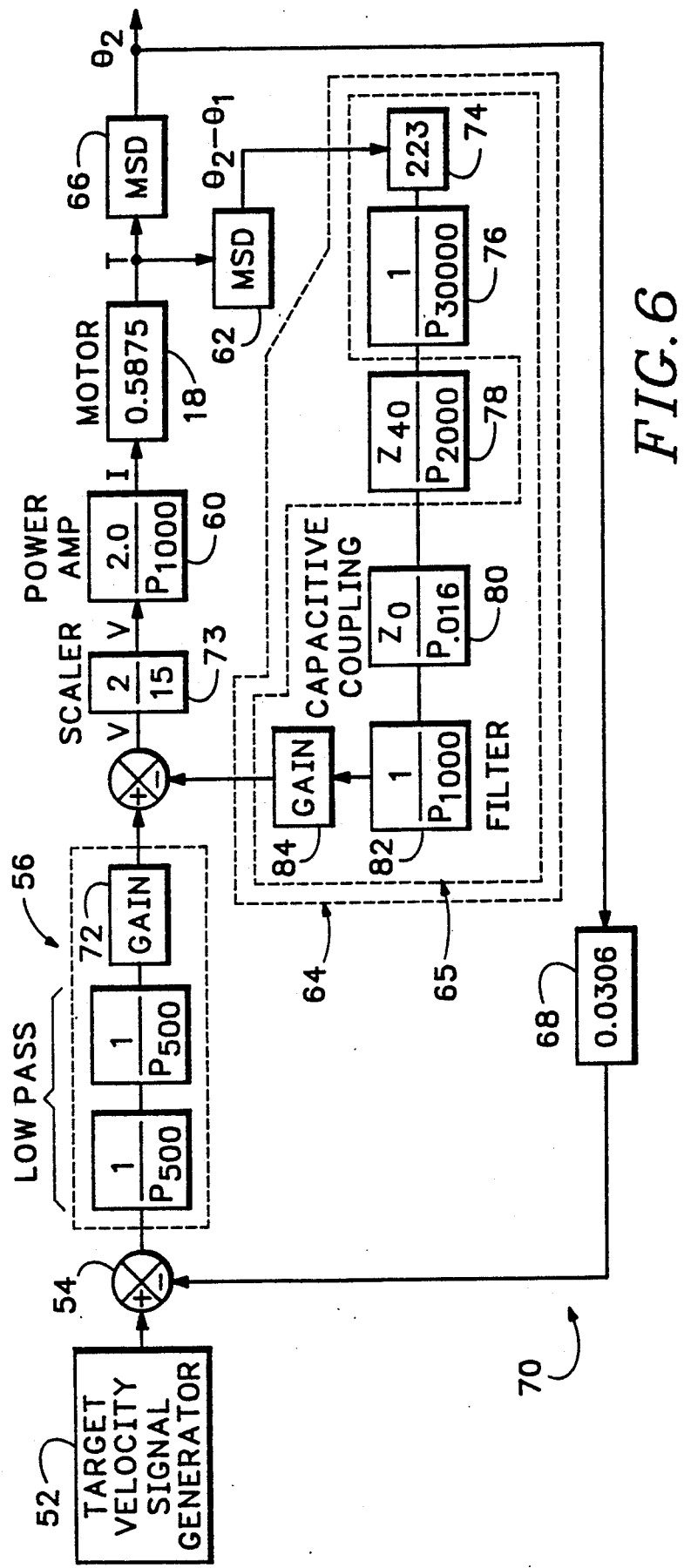
FIG. 6 is a more detailed block diagram showing the loop topology/of the system of FIG. 5.

The transfer equations discussed previously were used to generate the actual control system 70 shown in FIG. 6. The components which are the same as those shown in FIG. 5 are given the same reference numerals. Compensator 56 comprises two lowpass filters having poles at 500 Hz and a gain block 72 scaled to correspond to the overall loop gain desired. This is preferably set at 50 for the system shown. A scaler gain of 2/15 as shown in block 74, adjusts the target velocity signal for input into power amp 60. The power amp has a gain factor of 2 amp/volt and a pole at 1000 Hz (shown as $P_{1000}$). The motor used has a torque factor of 0.5875 lb-in/amp. The velocity transfer gain shown in box 68 has a scale factor of 0.0306.

The inner servo loop applies a strain gauge sensitivity factor of 223 at block 74. An amplifier pole at 30,000 Hz ($P_{30,000}$) is represented by filter 76. A pole/zero compensator 78 provides a circuit having a zero at 40 Hz ($Z_{40}$) and a pole at 2000 Hz ($P_{2000}$) to convert the strain gauge relative position signal to a relative velocity signal. Capacitive coupling represented by block 80 has a zero at 0 Hz ($Z_o$) and a pole at 0.016 ($P_{0.016}$). A 1000 Hz ($P_{1000}$) lowpass filter 82 is then coupled to the inner loop gain 84 which is preferably set at 10. The transfer functions are effected in this system as previously discussed.

Figure 7:
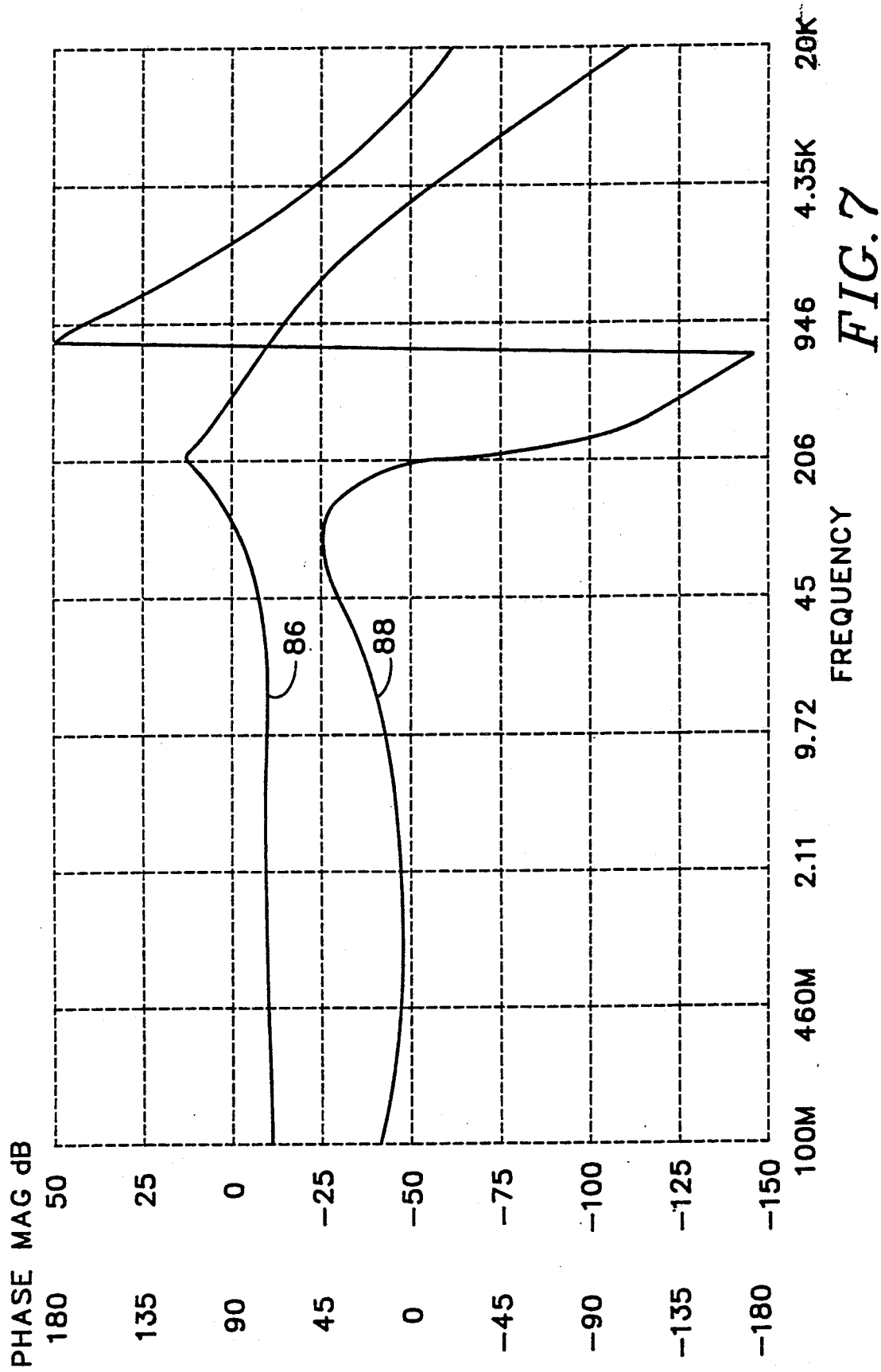
FIGS. 7, 8 and 9 are Bode plots illustrating the predicted operation of the system of FIG. 6 based upon Laplace transforms of the system components.
Figure 8:
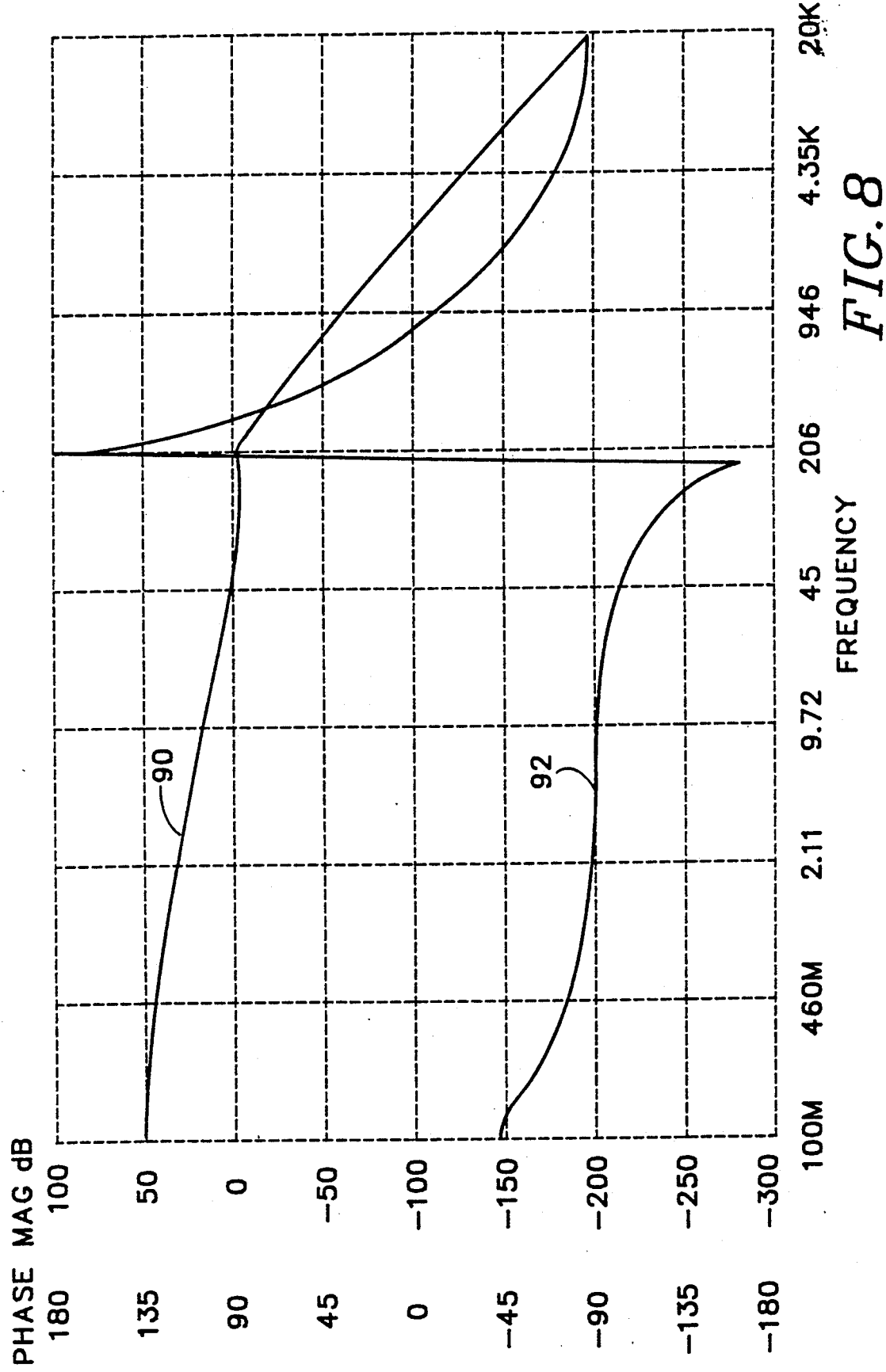
Figure 9:
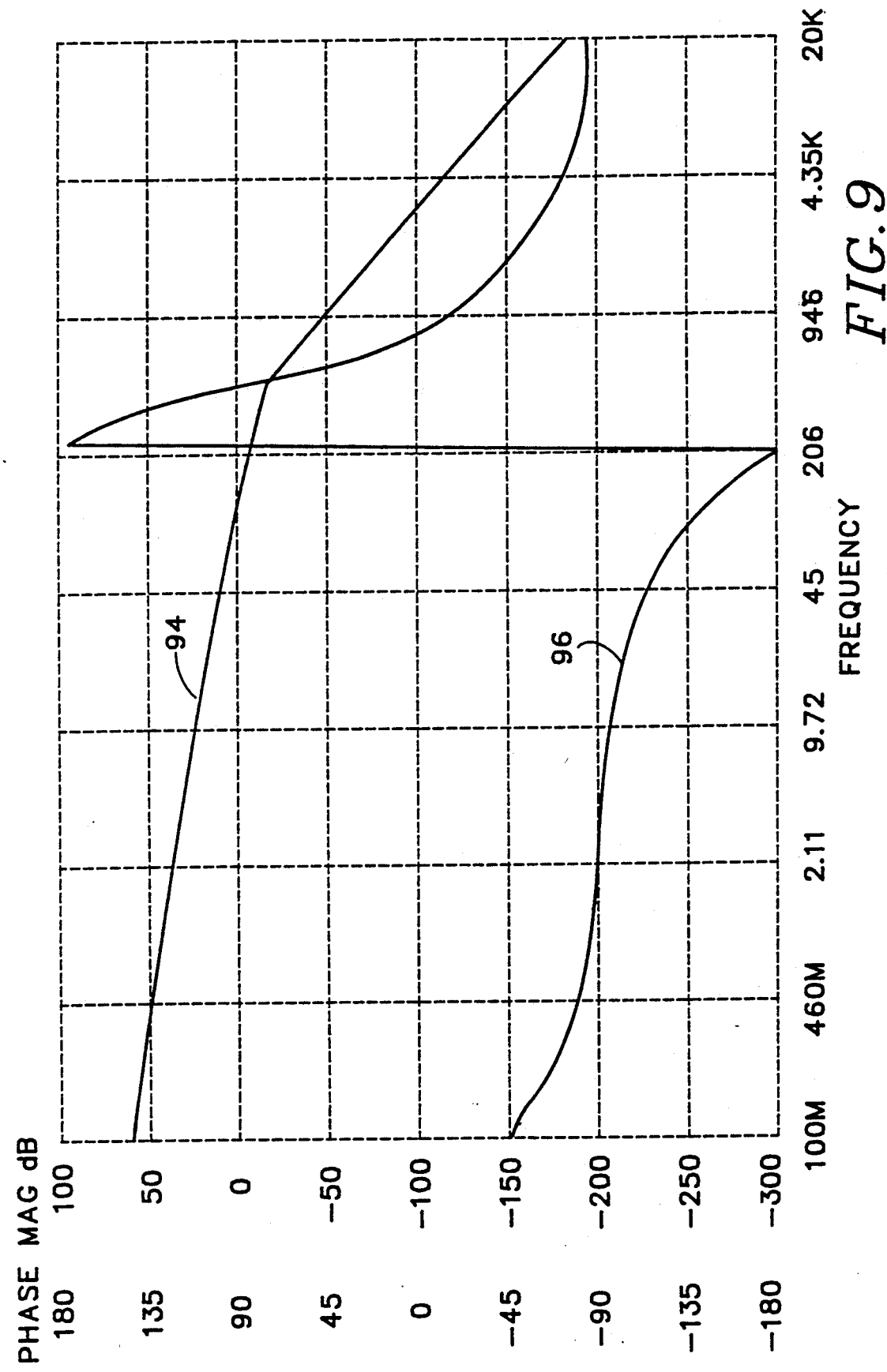

Bode Plots for these types of systems provide a coordinated amplitude vs. frequency and phase vs. frequency presentation. The loop gain of the system is established by setting the zero dB (unity gain) line on the Bode Plot for the system. FIGS. 7, 8 and 9 illustrate various Bode Plots for the control system as provided by a computer simulation using the transfer functions to model the mass/spring damping dynamics.

FIG. 7 shows the Bode plot for the control system with the outer loop disabled. A resonant peak is shown to exist on magnitude curve 86 at just past 206 Hz and there is zero dB gain at $-135°$ phase shift or 45° phase margin as illustrated on phase curve 88.

FIG. 8 shows the control system with the inner loop disabled, thereby using only the outer loop velocity feedback signal. The magnitude and phase are shown by curves 90 and 92, respectively. This Bode plot shows an undesirable resonant peak which would force the 0 dB line (unity gain) to only 45 Hz. The resonant peak exhibited by the single loop servo system illustrated in FIG. 8 generally requires an undesirable reduction in band width and loop gain to maintain the system in a stable condition, that is, in a linear feedback mode rather than an oscillation mode.

Combined inner and outer loop control system operation is represented by the Bode plot shown in FIG. 9. Here it is clear that there is no resonant frequency peak in magnitude curve 94, and there is the desired zero dB gain at $-135°$ phase shift and approximately 150 Hz, identified by phase curve 96. The inner/outer servo loop topology of the control system of the present invention removes the resonant peak caused by the mass/spring system and provides a stable servo control system.

The system of FIG. 6 has been reduced to practice and found to perform substantially as expected. This system can therefore be seen to be very stable and effective in controlling operation of the motor and carriage to obtain the desired velocity travel characteristics of the carriage. It will be appreciated that such a control system can be developed for any motor-driven mass where the path must be controlled. Further, although a load cell comprising a strain gauge sensor mounted on the coupling member was used to determine the positional change of the mass due to the flexure of the belt or cable, other devices may also be used to provide a signal representative of the cable flexure.

Although the strain gauge sensor described above is suitable for many applications and permits modulation of the target velocity profile so that actual carriage velocity corresponds more closely to the desired velocity, strain gauge sensors exhibit some inherent disadvantages. Strain gauge transducers are prone to drifting and thus must be monitored and frequently calibrated to assure high accuracy performance. Additionally, strain gauge transducers generate a relative position signal which requires signal differentiation to provide a relative velocity signal. The differentiated signal is generally high frequency noise sensitive. For some applications, therefore, it may be preferred to employ different types of position or velocity transducers.

Figure 10:
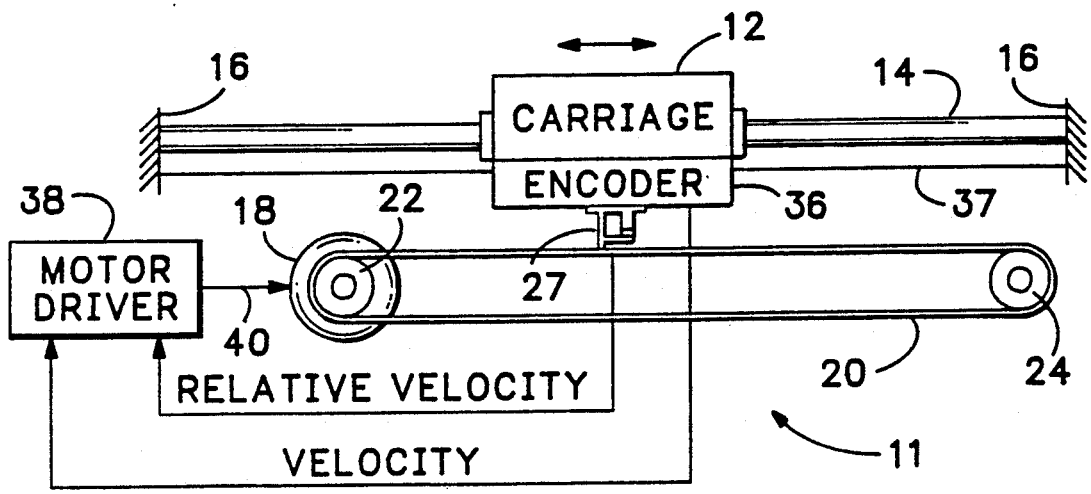
FIG. 10 shows a block diagram schematically illustrating another embodiment of the control system of the present invention employing a relative velocity transducer.

FIG. 10 shows a general block diagram illustrating a control system utilizing inner and outer servo loops according to the present invention and including a relative velocity transducer that produces a signal directly indicative of relative carriage velocity. Control system 11 of the present invention is similar to control system 10 illustrated in FIG. 1, but the inner servo loop employs a relative velocity transducer in place of the strain gauge sensor. Coupling member 27 is mounted on carriage 12 and cable 20 to accurately convey the movement of cable 20 to movement of carriage 12. Optical encoder 36 mounted on carriage 12 reads linear encoding strip 37 and provides velocity information for the outer servo loop of the control system.

In contrast to the system shown in FIG. 1, coupling member 27 in system 11 comprises a relative velocity transducer that senses carriage velocity relative to motor velocity directly without requiring differentiation of relative position signal. Preferred relative velocity transducers comprise magnetic circuits that operate using variable reluctance properties. Preferred relative velocity transducers are described with reference to Figs. 11-15.

Figure 11:
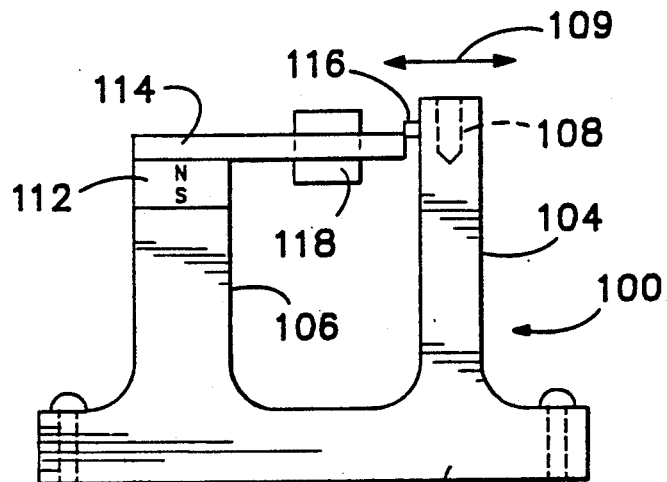
FIGS. 11-15 illustrate various embodiments of relative velocity transducers suitable for use with the present invention.

Relative velocity transducer 100 shown in FIG. 11 comprises base member 102 having a mounting arm 104 and a support arm 106 extending therefrom. Base member 102 is rigidly, mechanically mounted to carriage 12. The terminal end of mounting arm 104 is rigidly mounted to cable 20, such as by anchoring a fastener passing through cable 20 in fastener receiving means 108. Arrow 109 indicates the direction of motion of cable 20 (and thus carriage 12).

Base member 102 is formed from a rigid, metallic material. Suitable materials include sintered iron, nickel-iron alloys, and other iron-containing alloys. Ideally, the transducer must be many times stiffer than the belt or cable whose extension it is measuring. Iron-containing metals resulting in a transducer stiffness of from about 20,000 to about 50,000 lb/in are preferred.

Support arm 106 is shorter than mounting arm 104, and a magnet 112 is mounted at the terminal end thereof in a specified orientation. Magnet 112 is preferably aligned with its South pole in proximity to arm 106 and its North pole adjacent a pole piece material or a material that is capable of being magnetized. Since it is desirable to minimize the weight of moving components such as the relative velocity transducer, magnetic materials having a high energy product, such as samarium-cobalt (Sm-Co) and Niobium-Iron (Nb-Fe) are preferred magnetic materials. AlNiCo (Aluminum-Nickel-Cobalt) alloys are also suitable but, for a given output level, would be physically much larger. A samarium-cobalt bias magnet having dimensions of about 0.3"×0.3"×0.1" is especially preferred.

Pole piece 114 is rigidly mounted to magnet 112 extending toward mounting arm 104 and aligned on a plane generally perpendicular to the plane of mounting arm 104. Pole piece 114 also comprises a rigid, metallic material such as iron or an iron-containing alloy. Pole piece 114 may be formed from the same material as base member 102. Air gap 116 is provided between the terminal end of pole piece 114 and the surface of mounting arm 104 and has a precise, predetermined or measurable width. Air gap 116 is preferably from about 5 to about 50 mils in width, and most preferably about 10 mils in width. In general, smaller width air gaps are preferred, since the output level increases as the air gap width decreases. Coil 118 is wound around the extending portion of pole piece 114, and connected to the input of a local preamplifier circuit. A variety of coils utilizing different numbers of turns and different wire sizes may be implemented. Coils used in experimental designs had 750 turns of #40 wire.

The magnetic circuit provided by the relative velocity transducer described above operates according to variable reluctance principles to generate a relative velocity signal that can be used in the inner servo loop without requiring further processing. As the cable force varies, mounting arm 104 bends very slightly and modulates the width of air gap 116, thereby changing the reluctance of that portion of the circuit. The total flux of the magnetic circuit is inversely related to the reluctance. Reluctance, in turn, is related to the distance or air gap width.

The total magnetic flux of the system is thereby modulated according to changes in the force applied to the cable. Faraday's law states that the induced emf in a circuit is related to the rate at is, the voltage output of coil 118 is related to the change in total flux over time, and the output of the coil is thus proportional to the change in force applied to the transducer over time. Relative velocity transducers according to the present invention operate according to these variable reluctance principles, whereby as the width of the air gap is modulated by changes in the force exerted on the cable, voltage through the coil is modulated in a corresponding fashion.

FIG. 12-15 illustrate similar types of relative velocity transducers suitable for use with the methods and apparatus of the present invention. Although some of the elements are configured or arranged differently, many of the elements correspond to those described with reference to FIG. 11, and corresponding reference numerals have been used for corresponding elements.

Figure 12:
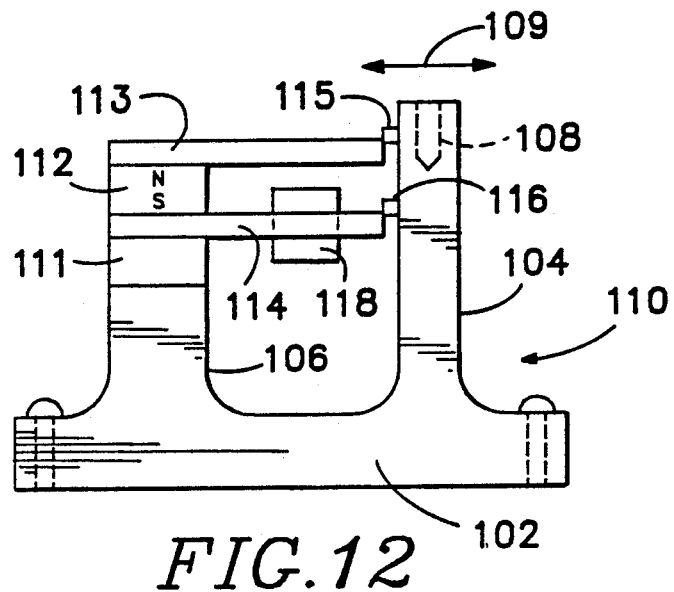

Relative transducer 110 shown in FIG. 12 has a slightly different configuration that effectively localizes the magnetic circuit by isolating much of the base member from the circuit. Support arm 106 is somewhat truncated and spacer member 111, comprising a material that serves as a magnetic insulator, is mounted at the terminal end thereof. Pole piece 114 is rigidly mounted to spacer member 111 extending toward mounting arm 104. Air gap 116 is provided between the terminal end of pole piece 114 and the surface of mounting arm 104. Coil 118 is wound around the extending portion of pole piece 114.

Magnet 112 is rigidly mounted to the opposite end of pole piece 114 and generally aligned with support arm 106. Magnet 112 is arranged in a specified orientation, with one of its poles in proximity to magnet 112 and the other adjacent second pole piece 113. Second pole piece 113 is rigidly mounted on the upper surface of magnet 112 and aligned in parallel with pole piece 114. Air gap 115 is provided between the terminal end of pole piece 113 and the surface of mounting arm 104. Pole pieces 114 and 113 and air gaps 116 and 115, respectively, preferably have corresponding dimensions. Air gaps having a width of about 7.5 mils are especially preferred.

In the embodiment shown in FIG. 12, spacer member 111, comprising a magnetic insulating material, localizes the magnetic circuit and thereby isolates most of base member 102 from the magnetic circuit. This configuration provides a high level of output, and it reduces hysteresis losses in the circuit. Additionally, the relative velocity transducer illustrated in FIG. 12 has a lower susceptibility to magnetic noise than other configurations have.

Figure 13:
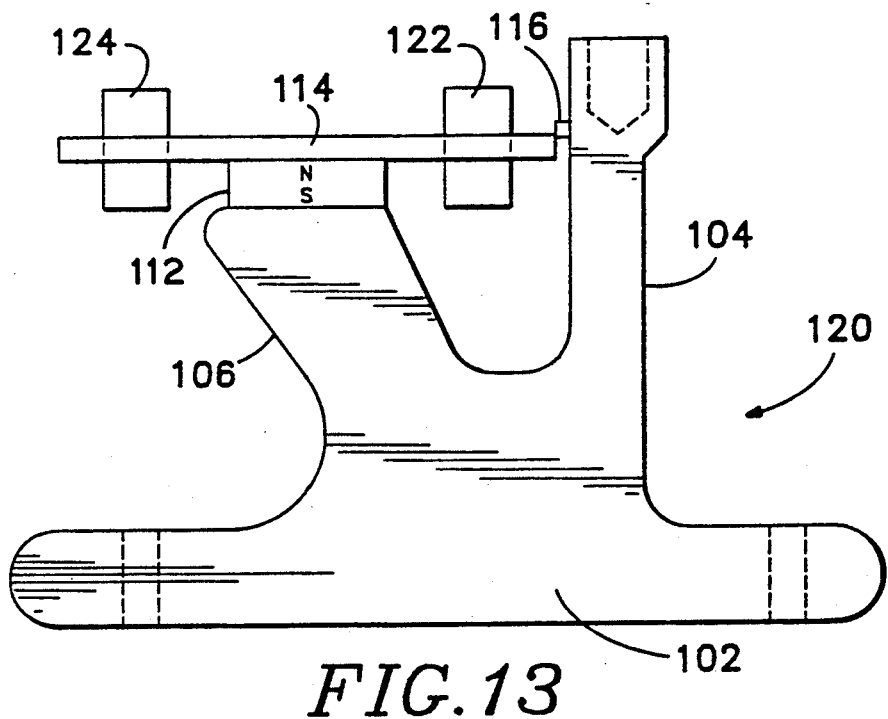

Relative velocity transducer 120, shown in FIG. 13, comprises base member 102 having mounting arm 104 and support arm 106 extending therefrom. Magnet 114 is mounted on support arm 106 in a predetermined orientation. Pole piece 114 is rigidly mounted on magnet 112, and extends linearly both toward and away from mounting arm 104. Pole piece 114 has a signal coil 122 and a bucking coil 124 wound around opposite sides of the pole piece with respect to magnet 112. The coils are wound in the same direction and are preferably connected in series, but with opposed polarity. That is, the positive terminal of the signal coil is connected to the positive terminal of the bucking coil. This arrangement produces some degree of stray magnetic field cancellation.

Figure 14:
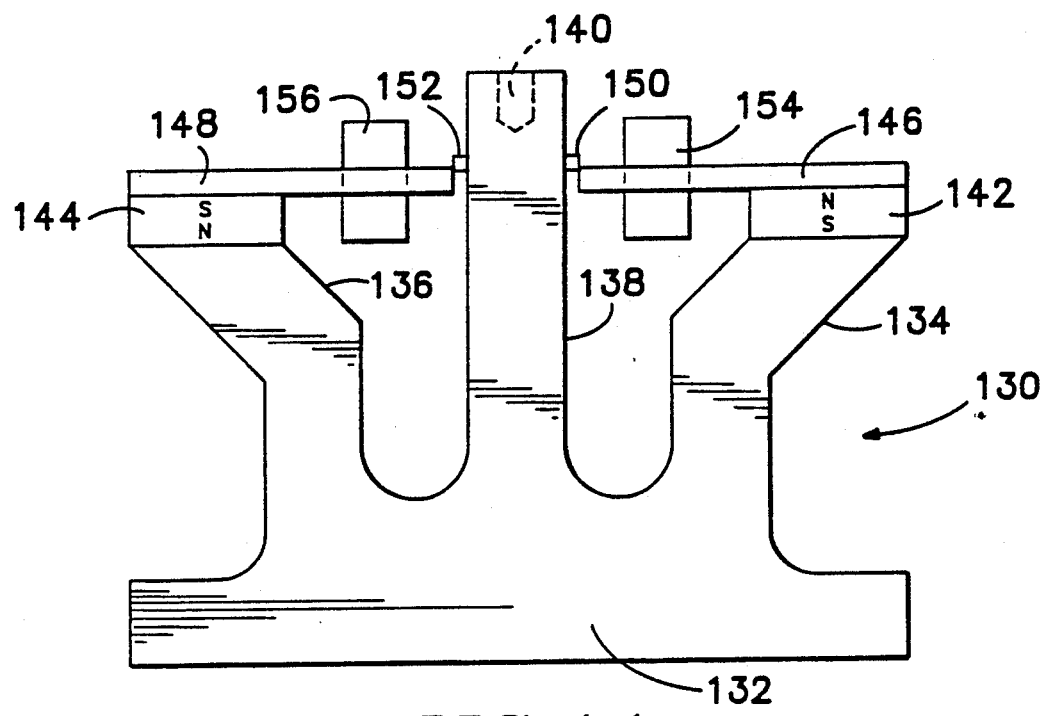
Figure 15:
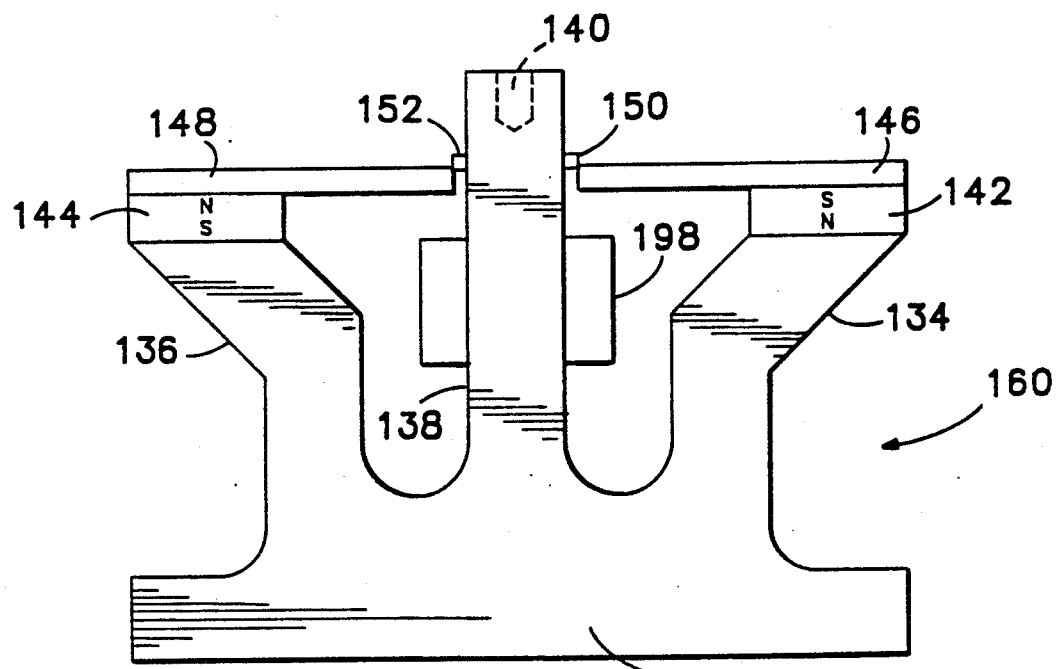

FIGS. 14 and 15 illustrate additional embodiments of relative velocity transducers suitable for use in the methods and apparatus of the present invention. Relative velocity transducer 130 shown in FIG. 14 comprises base member 132 having two support arms 134, 136 and a central mounting arm 138. The terminal end of central mounting arm 138 is rigidly mounted to the flexible cable, such as by anchoring a fastener passing through cable 20 in fastener receiving means 140. Base member 132 is preferably formed from the materials described earlier with reference to base member 102.

Magnets 142 and 144 are mounted at the terminal ends of support arms 134 and 136, respectively, in a specified orientation. As shown in FIG. 14, magnets 142 and 144 are mounted in opposite orientations, one having its North pole in proximity to the support arm and the other having its South pole in proximity to the support arm. The absolute orientation of each magnet is unimportant, but it is important that the magnets are mounted in opposite orientations. Pole pieces 146 and 148 are rigidly mounted on magnets 142 and 144, respectively, and extend toward central mounting arm 138. Air gaps 150 and 152 are provided between the terminal ends of pole pieces 146 and 148 and central mounting arm 138, respectively. Air gaps 150 and 152 preferably have corresponding widths. Coils 154 and 156 are wound around the extending portions of pole pieces 146 and 148, respectively, in the same direction and connected in series with opposed polarity. The pole pieces, air gaps and coils used in the embodiments of FIGS. 14 and 15 are preferably substantially the same as those described earlier with reference to FIG. 11. The arrangement illustrated in FIG. 14 provides twice the signal magnitude for a given input velocity compared to the single magnetic circuit, and it also produces some cancellation of stray magnetic fields.

Relative velocity transducer 160 illustrated in FIG. 15 is similar to the embodiment shown in FIG. 14, except that a single coil 158 is wound around central mounting arm 138. Transducer 160 functions similarly to transducer 130, described above, and is probably less expensive to manufacture, since it has only a single coil. The noise cancellation provided by transducer 160, however, may be less effective than that provided by transducer 130.

Figure 16:
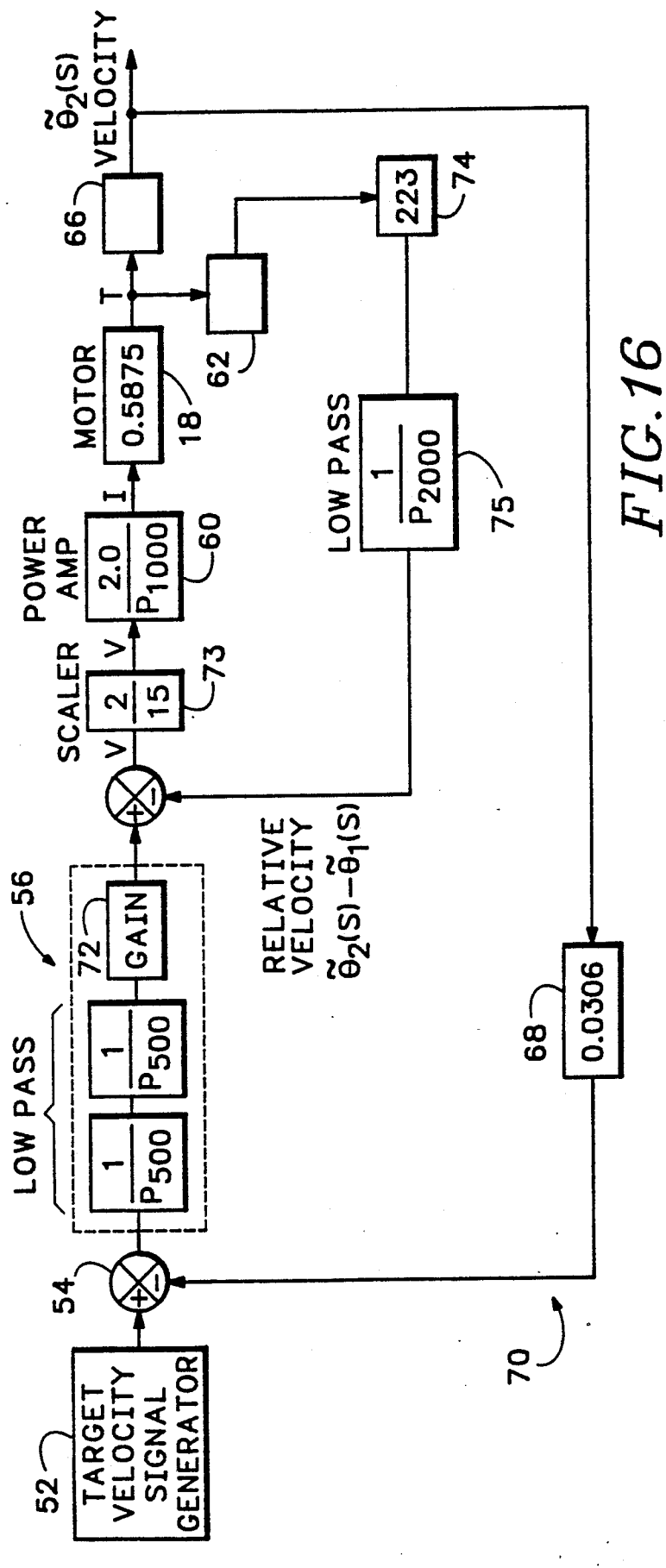
FIG. 16 is a block diagram illustrating the loop topology for the system of FIG. 10 using a relative velocity transducer of the type shown in FIGS. 11-15.

FIG. 16 illustrates the loop topology for a control system 71 of the present invention having inner and outer servo loops and employing a relative velocity transducer in the inner loop. The components that are the same as those shown in Figs. 5 and 6 are given the same reference numerals. Briefly, target velocity generator 52 feeds a target velocity signal through signal combiner 54, compensator 56, and signal combiner 58. Scaler 73 adjusts the target velocity for input into power amplifier 60, which processes the signal for driving motor 18. A carriage velocity signal $\hat{\Theta}_2(s)$ is generated at 66 for the outer servo loop, and the outer loop carriage velocity signal is input through velocity transducer gain circuit 68. An appropriate outer loop velocity error signal is thereby generated at signal combiner 54 for adjusting the target velocity signal. A relative carriage velocity signal $\hat{\Theta}_2(s) - \hat{\Theta}_1(s)$ is generated at 62 for the inner servo loop, and the inner loop relative carriage velocity signal is input through sensor amplifier 74. An appropriate inner loop velocity error signal for adjusting the target velocity signal is thereby generated at signal combiner 58 via low pass filter 75 having a pole at 2,000 Hz. Filter 75 removes unneeded high frequency components from the relative velocity transducer signal. The inner servo loop employed in this embodiment provides a direct measure of relative carriage velocity and provides generally simplified operation.

Control systems having the inner/outer loop topology of the present invention and employing a strain gauge sensor were compared to control systems having the inner/outer loop configuration and employing a relative velocity transducer. Each of these systems was also compared to a control system employing an outer loop alone. The maximum possible loop gain was experimentally determined by adjusting each of the systems to the threshold of oscillation. The loop gain for the system of the present invention wherein the inner servo included a strain gauge sensor was about four times the loop gain of the system employing the outer loop alone. The loop gain for the system of the present invention wherein the inner servo included a relative velocity transducer was about seven to about fifteen times the loop gain of a system employing the outer loop alone.

Thus, although the invention has been described with reference to the foregoing preferred embodiment, it will be apparent to those skilled in the art that variations and changes may be made without varying from the spirit and scope of the invention as defined in the claims.

I claim:

1. A system for monitoring the movement of a mass driven by a flexible element comprising:
    a mass moveable along a predetermined path;
    a flexible element coupled to the mass;
    a motor for driving the flexible element and thereby the mass along a predetermined path;
    a transducer mounted on the mass and in communication with the flexible element capable of detecting a physical characteristic of the flexible element representative of velocity of the mass relative to velocity of the motor; and
    means for generating a relative velocity signal therefrom.

2. A system according to claim 1, additionally comprising:

means for generating a target velocity signal in communication with the motor for controlling rotational output of the motor and thereby the velocity of the mass; and means for combining the target velocity signal with the relative velocity signal and generating a mass velocity error signal.

3. A system according to claim 2, additionally comprising:

means for modifying the target velocity signal in accordance with the mass velocity error signal.

4. A system according to claim 1, wherein the mass is a shuttle carriage of an ink jet printer and the flexible element is a cable.

5. A system according to claim 1, wherein the relative velocity transducer utilizes a magnetic circuit operating according to variable reluctance principles to generate the relative velocity signal.

6. A system according to claim 5, wherein the relative velocity transducer comprises:

a base member having a support arm and a mounting arm extending therefrom, the mounting arm being connected to the flexible element, and the base member comprising an iron-containing rigid metallic material;

a magnet mounted on the support arm with its poles arranged in a predetermined orientation;

a pole piece mounted on the magnet having an extending portion extending toward the mounting arm and forming an air gap between its terminal end and a surface of the mounting arm; and a coil wound around the extending portion of the pole piece.

7. A dual loop servo system for monitoring and controlling the movement of a mass moved along a predetermined path by a motor-driven flexible member comprising:

an outer servo loop employing linear encoder techniques to generate a signal indicative of the velocity of the mass; and an inner servo loop employing a sensor that detects a physical characteristic of the flexible member representative of the velocity of the mass relative to the velocity of the motor to generate a relative velocity signal.

8. A dual loop servo system according to claim 7, wherein:

the sensor comprises a relative velocity transducer mounted on the mass and connected to the motor-driven flexible member.

9. A dual loop servo system according to claim 8, additionally comprising:

means for generating a target velocity signal in communication with the motor for controlling rotational output of the motor and thereby the velocity of the mass as it moves along its predetermined path;

means for combining the target velocity signal with the relative velocity signal and generating a mass velocity error signal; and means for modifying the target velocity signal in accordance with the mass velocity error signal.

10. A dual loop servo system according to claim 8, wherein the relative velocity transducer utilizes a magnetic circuit operating according to variable reluctance principles to generate the relative velocity signal.

11. A dual loop servo system according to claim 7, wherein the mass is a shuttle carriage of an ink jet printer.

12. A dual loop servo system according to claim 7, wherein the mechanical stiffness of the sensor is significantly higher than that of the flexible member.

13. A dual loop servo system according to claim 8, wherein the relative velocity transducer comprises:

a base member having a support arm and a mounting arm extending therefrom, the mounting arm being connected to the flexible element, and the base member comprising an iron-containing rigid metallic material;

a magnet mounted on the support arm with its poles arranged in a predetermined orientation;

a pole piece mounted on the magnet having an extending portion extending toward the mounting arm and forming an air gap between its terminal end and a surface of the mounting arm; and a coil wound around the extending portion of the pole piece.

14. A dual loop servo system according to claim 13, wherein the air gap formed between the terminal end of the pole piece and the surface of the mounting arm is from about 5 mils to about 50 mils in width.

15. A dual loop servo system according to claim 13, wherein the coil wound around the extending portion of the pole piece is a signal coil, and the system additionally comprises a bucking coil wound in the same direction as the signal coil around an opposite side of the pole piece and connected in series with the signal coil, but with opposed polarity.

16. A dual loop servo system according to claim 8, wherein the relative velocity transducer comprises:

a base member having a support arm and a mounting arm extending therefrom, the mounting arm being connected to the flexible element, and the base member comprising an iron-containing rigid metallic material;

a magnetic insulator mounted on the support arm;

a first pole piece mounted on the magnetic insulator having an extending portion extending toward the support arm and defining an air gap between its terminal end and a surface of the mounting arm;

a magnet mounted on the first pole piece generally aligned with the support arm, with its poles arranged in a predetermined orientation; and a second pole piece mounted on the magnet and generally aligned with the first pole piece, the second pole piece having an extending portion extending toward the mounting arm and defining a second air gap between its terminal end and a surface of the mounting arm; and a coil wound around the extending portion of the first pole piece.

17. A dual loop servo system according to claim 8, wherein the relative velocity transducer comprises:

a base member having a central mounting arm and two support arms extending therefrom, the central mounting arm being connected to the flexible element, and the base member comprising an iron-containing rigid metallic material;

a magnet mounted on each support arm with its poles arranged in a predetermined orientation;

a pole piece mounted on each magnet, each pole piece having an extending portion extending toward the mounting arm and defining an air gap between its terminal end and a surface of the mounting arm; and a coil wound around the extending portion of each pole piece, the coils being wound in the same direction and connected in series with opposed polarity.

18. A dual loop servo system for monitoring and controlling the movement of a mass moved along a predetermined path by a motor-driven flexible member comprising:
- a first servo loop employing linear encoder techniques to generate a mass velocity signal; and
- a second servo loop employing a sensor that detects a physical characteristic of the flexible member representative of the velocity of the mass relative to the velocity of the motor.

19. A relative velocity transducer that senses velocity of a mass movable along a predetermined path by a motor-driven flexible element coupled to the mass relative to the velocity of rotational output of the motor utilizing a magnetic circuit operating according to variable reluctance principles.

20. A relative velocity transducer according to claim 19, comprising:
- a base member having a support arm and a mounting arm extending therefrom, the mounting arm being connected to the flexible element, and the base member comprising an iron-containing rigid metallic material;
- a magnet mounted on the support arm with its poles arranged in a predetermined orientation;
- a pole piece mounted on the magnet having an extending portion extending toward the mounting arm and defining an air gap between its terminal end and a surface of the mounting arm; and
- a coil wound around the extending portion of the pole piece.

* * * * *